US012789744B2

(12) United States Patent
Araya et al.

(10) Patent No.: US 12,789,744 B2
(45) Date of Patent: Nov. 10, 2026

(54) AIRBAG DEVICE FOR PEDESTRIAN PROTECTION

(71) Applicant: AUTOLIV DEVELOPMENT AB, Vargarda (SE)

(72) Inventors: Shoki Araya, Kanagawa (JP); Tomoaki Harada, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 19/116,165

(22) PCT Filed: Sep. 14, 2023

(86) PCT No.: PCT/JP2023/033494
§ 371 (c)(1),
(2) Date: Mar. 27, 2025

(87) PCT Pub. No.: WO2024/070722
PCT Pub. Date: Apr. 4, 2024

(65) Prior Publication Data

US 2026/0103163 A1 Apr. 16, 2026

(30) Foreign Application Priority Data

Sep. 29, 2022 (JP) ................................ 2022-157160

(51) Int. Cl.
*B60R 21/00* (2006.01)
*B60R 21/233* (2006.01)
(Continued)

(52) U.S. Cl.
CPC ............ *B60R 21/36* (2013.01); *B60R 21/233* (2013.01); *B60R 21/2334* (2013.01); *B60R 2021/0004* (2013.01); *B60R 2021/23324* (2013.01)

(58) Field of Classification Search
CPC ..... B60R 21/23; B60R 21/231; B60R 21/233; B60R 21/2334; B60R 21/2342;
(Continued)

(56) References Cited

U.S. PATENT DOCUMENTS

2009/0051149 A1 2/2009 Kalandek et al.
2017/0203712 A1* 7/2017 Aiba ..................... G06V 20/58
(Continued)

FOREIGN PATENT DOCUMENTS

JP 2003-063334 A 3/2003
JP 2003-165402 A 6/2003
(Continued)

OTHER PUBLICATIONS

Description Translation for JP 2003312405 from Espacenet (Year: 2003).*

(Continued)

*Primary Examiner* — Daniel M. Keck
(74) *Attorney, Agent, or Firm* — Harness, Dickey & Pierce, P.L.C.; Ryan W. Massey

(57) ABSTRACT

A pedestrian protection airbag device as including a gas generator that generates expansion gas and an airbag that is expanded by the expansion gas that protects a pedestrian and the like that collides with the vehicle by deploying from the boundary part of the hood and the windshield of the vehicle. Furthermore, the airbag includes a main chamber enabled to deploy from the boundary part on an upper part of the hood and a sub-chamber connected to the lower part of the main chamber that deploys prior to the main chamber under the hood.

15 Claims, 9 Drawing Sheets

(51) Int. Cl.
*B60R 21/2334* (2011.01)
*B60R 21/36* (2011.01)

(58) Field of Classification Search
CPC .................. B60R 21/34; B60R 21/36; B60R 2021/0004; B60R 2021/23324
USPC .......................................................... 180/271
See application file for complete search history.

(56) References Cited

U.S. PATENT DOCUMENTS

| | | | | |
|---|---|---|---|---|
| 2020/0331424 | A1* | 10/2020 | Cord | B60R 21/36 |
| 2023/0249642 | A1* | 8/2023 | Hanawa | B60R 21/36<br>180/274 |

FOREIGN PATENT DOCUMENTS

| | | | | | |
|---|---|---|---|---|---|
| JP | 2003-200800 | A | | 7/2003 | |
| JP | 2003-312405 | A | | 11/2003 | |
| JP | 2003-327064 | A | | 11/2003 | |
| JP | 2007-153062 | A | | 6/2007 | |
| JP | 2015-157616 | A | | 9/2015 | |
| JP | 2019-026223 | A | | 2/2019 | |
| JP | 2019026045 | A | * | 2/2019 | B60R 21/233 |
| JP | 2020-100378 | A | | 7/2020 | |
| JP | 2022-079360 | A | | 5/2022 | |
| KR | 101460723 | B1 | * | 11/2014 | B60R 21/36 |
| WO | 2016/103796 | A1 | | 6/2016 | |

OTHER PUBLICATIONS

Description Translation for WO 2016103796 from Espacenet (Year: 2016).*

* cited by examiner

C1-C1

AIRBAG DEVICE FOR PEDESTRIAN PROTECTION

TECHNICAL FIELD

The present invention relates to a pedestrian protection airbag device that protects pedestrians and cyclists who are hit by a vehicle.

BACKGROUND ART

Providing a vehicle with one or a plurality of airbag devices in order to protect an occupant therein in the event of a vehicle accident is well known. Airbag devices come in a variety of forms, including a driver's airbag device that expands an airbag near the center of the steering wheel of the vehicle to protect the driver, a curtain airbag device that expands an airbag downward inside the window of the vehicle to protect the occupant in the event of a lateral impact or rollover or rollover accident, and a side airbag device that expands an airbag between the occupant and a side panel to protect the occupant in the event of a lateral impact on the vehicle. There is also a pedestrian protection airbag device that protects pedestrians and cyclists who are hit by a vehicle.

Some pedestrian protection airbag devices have an airbag compressed into a rod shape and are arranged to extend laterally (in the vehicle width direction) near the boundary between the hood and the windshield of the vehicle. In such pedestrian protection airbag devices, the direction in which the airbag deploys is difficult to control, and there is a risk that the airbag will not deploy quickly in the desired direction.

For example, even if the desire is to quickly deploy an airbag over the hood, the airbag may deploy upward in the initial stage of deployment, causing a momentary delay before the airbag assumes the appropriate deployed shape along the hood.

RELATED ART DOCUMENTS

Patent Documents

Patent Document 1: Japanese Unexamined Patent Application 2003-200800

SUMMARY OF THE INVENTION

Problem to be Solved by the Invention

In light of the circumstances described above, an object of the present invention is to provide a pedestrian protection airbag device that can reliably and quickly deploy an airbag in a desired direction.

In particular, an object of the present invention is to provide a pedestrian protection airbag device that can reliably protect pedestrians and cyclists by quickly deploying an airbag onto the hood.

Means for Solving the Problem

In order to resolve the problem described above, a pedestrian protection airbag device according to the present invention, includes:

- a gas generator that generates expansion gas; and
- an airbag that is expanded by the expansion gas that protects a pedestrian and the like that collides with the vehicle by deploying from the boundary part of the hood and the windshield of the vehicle;

furthermore, the airbag includes:

- a main chamber enabled to deploy from the boundary part on an upper part of the hood; and
- a sub-chamber connected to the lower part of the main chamber that deploys prior to the main chamber under the hood.

In the specification and claims of the present application, the direction in which a vehicle travels straight ahead is referred to as "forward", and the opposite direction is referred to as "back", and the coordinate axis is referred to as the "front-to-back direction". Additionally, "right side" and "left side" when facing forward, refer to the right and left sides in the width direction of the vehicle, which is perpendicular to the vehicle's direction of travel, and the coordinate axis is referred to as the "left-right direction" or "left-right width direction".

In the invention described above, the objects to be protected by the airbag are "pedestrians, and the like", and the objects to be protected include not only pedestrians but also people riding bicycles (cyclists).

Furthermore, a "windshield" may be called a "front glass". The "hood" is sometimes called a "bonnet".

As described above, in the present invention, the airbag includes a main chamber that can be deployed onto an upper part of the hood, and a sub-chamber that is connected to the lower part of the main chamber and deploys under the hood prior to the main chamber, so that deploying the sub-chamber enables control of the deployment behavior of the main chamber.

The sub-chamber may be configured to expand so as to push the main chamber onto the upper part of the hood.

By pushing the main chamber onto the upper part of the hood using the sub-chamber, the main chamber can be deployed reliably on the hood without being interfered with by the underside of the hood.

The sub-chamber may be provided so that the center thereof in the front-to-back direction is located backward of the center of the main chamber in the front-to-back direction.

By locating the sub-chamber, which begins to expand and deploy first, at the back side near the boundary between the hood and the windshield, the back-end part of the hood can be quickly pushed up, enabling reliable guidance of the main chamber onto the hood.

The sub-chamber and the main chamber may be in fluid communication with each other through an inner vent.

The inner vent may be formed backward of the center of the sub-chamber in the front-to-back direction.

By arranging the inner vent, which fluidly connects the sub-chamber and the main chamber, at the back of the sub-chamber, the inner vent is positioned further backward with respect to the main chamber. As a result, the back side of the main chamber begins to expand early, enabling the back end of the hood to be quickly pushed up, and the main chamber can be reliably exposed above the hood. In addition, by deploying the back portion of the main chamber early, the lower portion of the vehicle windshield and the portion corresponding to the A-pillar can be quickly covered by the main chamber.

The gas generator may be stowed in the sub-chamber.

The sub-chamber is preferably formed to have a smaller volume than the main chamber.

By minimizing the volume of the sub-chamber, the sub-chamber can be deployed quickly.

The main chamber may be configured so that a surface area of a front region extending over the hood is larger than a surface area of an upper region extending over the windshield.

In the main chamber, the front region and the upper region can be folded or rolled separately.

The main chamber and the sub-chamber are preferably folded or rolled separately.

By folding or rolling the main chamber and the sub-chamber independently, the main chamber does not obstruct expansion and deployment of the sub-chamber, which expands and deploys first, allowing the sub-chamber to deploy smoothly and quickly.

The airbag may further include a flap that is provided on an outer periphery of the airbag in a compressed state and that is capable of controlling the direction in which the airbag deploys. The flap preferably has a weakened part that breaks or opens in a desired direction of deployment of the airbag as the airbag expands and deploys.

The flap retains the compressed (rolled or folded) airbag and provides a weak part in the deployment direction, enabling reliable deployment of the airbag in the desired direction. In other words, by adjusting the position of the weakened part, the deployment direction of the airbag can be appropriately controlled. In addition, by adjusting the degree of weakness of the weak part, timing of the airbag deployment can be controlled. For example, if the weakened part is designed to be difficult to break, the timing of full deployment of the airbag can be delayed. Conversely, if the weakened part is designed to break easily, the timing of full deployment of the airbag can be advanced.

Note that the "flap" is a cloth-like member made of a flexible material, and can be made of, for example, the same or similar fabric as the airbag. In addition, the shape of the flap can be rectangular, trapezoidal, or other shapes depending on the location on the airbag to which the flap is connected and the shape of the airbag itself.

The weakened part may be formed in the vicinity of a front end of the airbag.

Here, "near the front end of the airbag" means a location corresponding to the most forward position of the airbag, but does not necessarily have to be the exact tip end.

The flap may be configured so that the weakened part retains the main chamber without breaking or opening until the main chamber reaches above the hood as the airbag deploys.

Here, "until reaching the hood" does not necessarily mean that the entire main chamber is completely mounted on the hood, but also means that the main chamber is raised to a position on the hood that does not interfere with the forward deployment thereof.

By configuring the flap so that the weak part is not broken or opened until the main chamber reaches above the hood, the main chamber can be quickly and reliably deployed above the hood.

The weakened part may be a slit or a breakable sewing line.

Note that in the present invention, the airbag is configured to deploy from the boundary part between the hood and windshield of the vehicle, and the deployment of the airbag itself can enlarge the gap at the boundary part. Alternatively, a lifter may be provided to push up the back portion of the hood in order to enlarge the gap at the boundary between the hood and the windshield.

DESCRIPTION OF THE PREFERRED EMBODIMENTS

An embodiment of the present invention will be described with reference to the accompanying drawings below.

Figure 1:
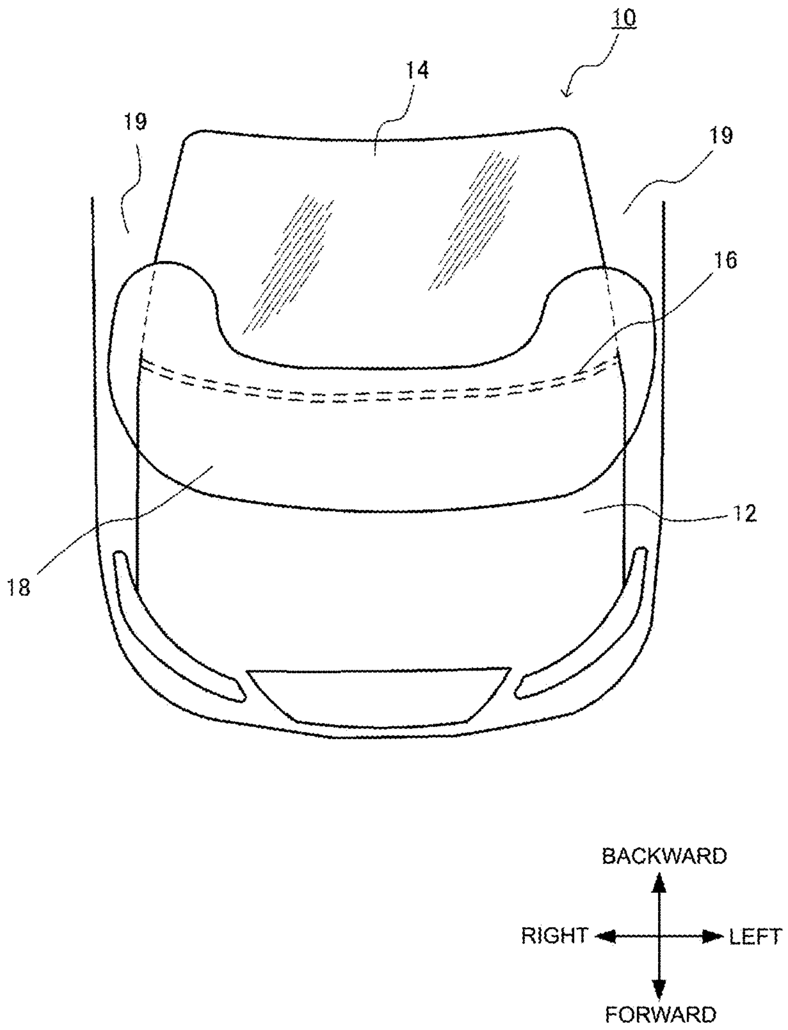
FIG. 1 is a top view depicting a pedestrian protection airbag device according to the present invention in an activated (deployed) state.
Figure 2A:
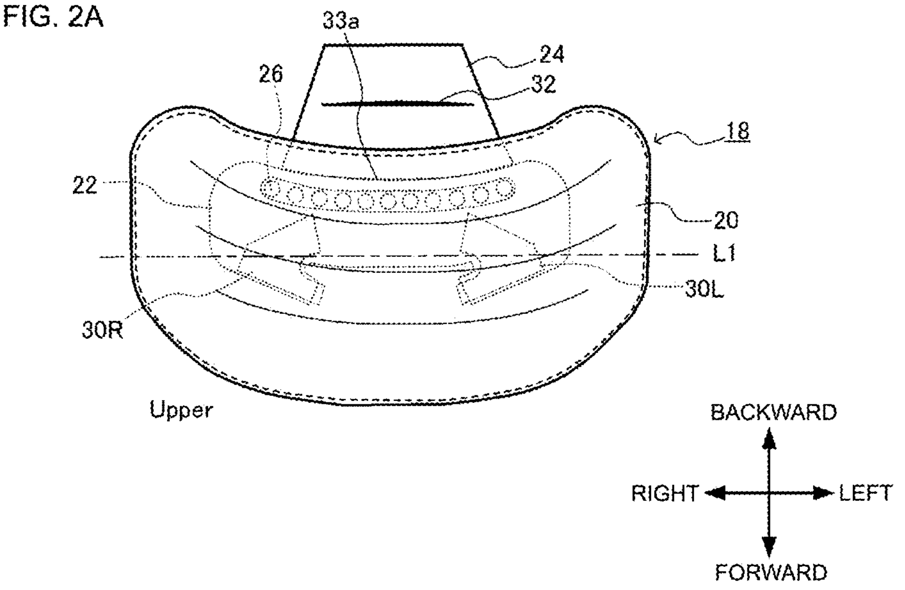
FIG. 2 is a plan view depicting the structure of an airbag of the pedestrian protection airbag device according to the present invention, where (A) is a top view and (B) is a bottom view.
Figure 2B:
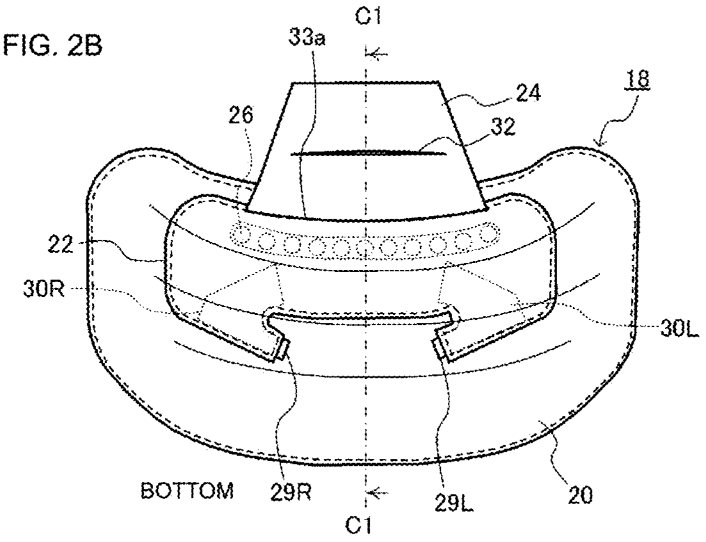
Figure 2B:
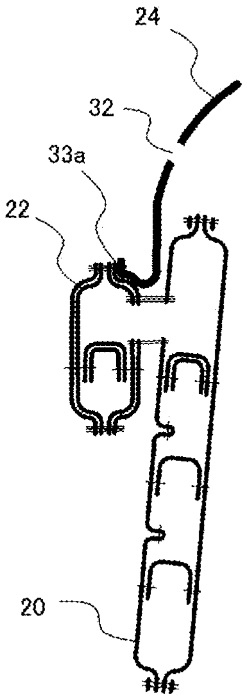
Figure 3:
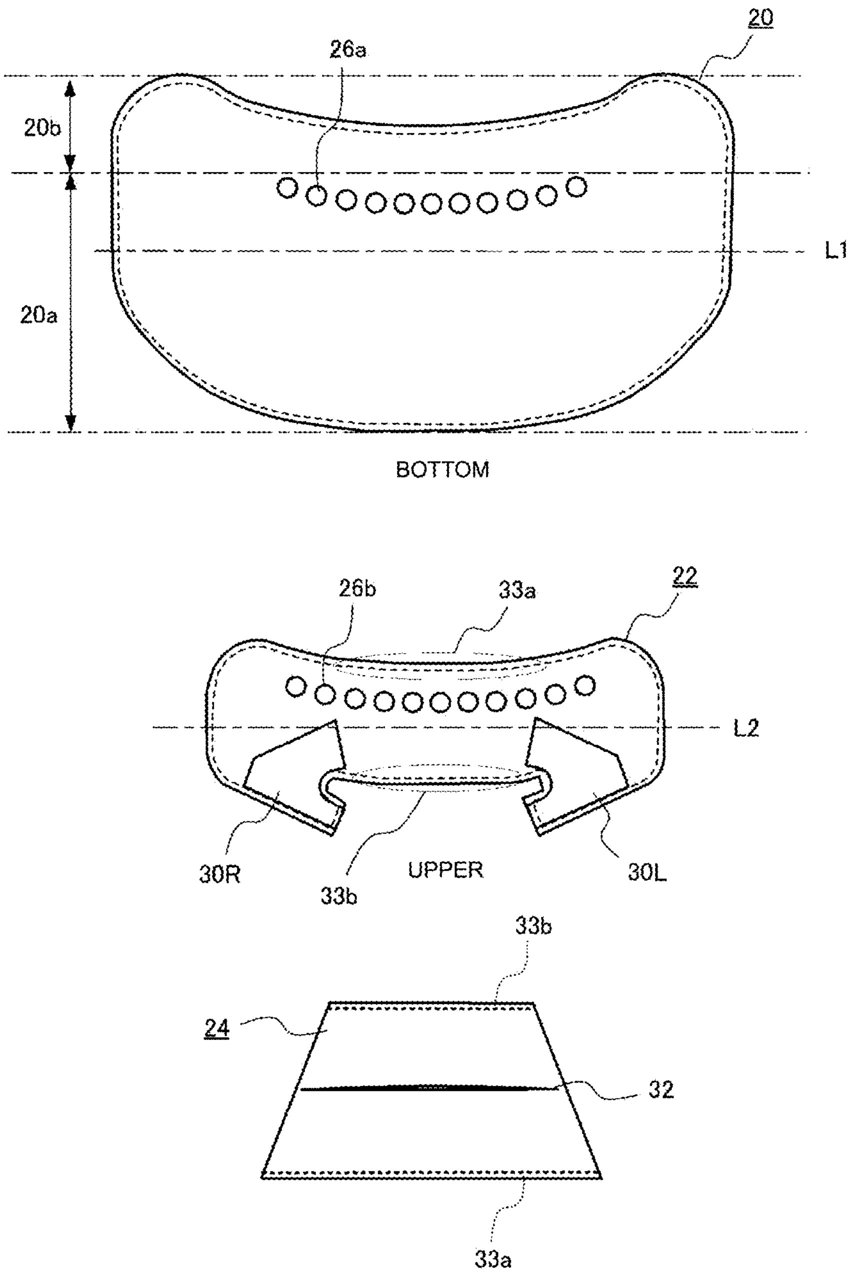
FIG. 3 is a plan depicting a panel configuration of an airbag according to the present invention.

FIG. 1 is a top view depicting a pedestrian protection airbag device according to an embodiment of the present invention in an activated (deployed) state. FIG. 2 is a plan view depicting the structure of an airbag of the pedestrian protection airbag device according to the embodiment, where (A) is a top view and (B) is a bottom view. FIG. 3 is a plan depicting a panel configuration of an airbag according to the embodiment.

The protective airbag device of the present Embodiment includes an airbag 18 that deploys from a boundary part 16 between the hood 12 and windshield 14 of the vehicle 10 to protect pedestrians and the like that collide with the vehicle 10; and a flap 24 that is provided on the outer periphery of the airbag 18 in a compressed state and that can control the direction in which the airbag 18 deploys. The airbag 18 includes a main chamber 20 that can be deployed forward over the hood 12 from the boundary part 16. The flap 24 is configured to be able to restrict the main chamber 20 from expanding upward.

As depicted in FIGS. 2 and 3, the airbag 18 includes a main chamber 20 and a sub-chamber 22 that is connected to a lower part of the main chamber 20 and deploys prior to the main chamber 20.

As depicted in FIG. 2, when the airbag 18 is laid flat, the sub-chamber 22 is connected to the main chamber 20 in a state offset backward with respect to a center line L1 in the front-to-back direction of the main chamber 20.

As depicted in FIG. 3, the main chamber 20 includes a front region 20*a* that extends forward on the hood 12 and an upper region 20*b* that extends upward along the windshield 14. In the main chamber 20, the surface area of the front region 20*a* is larger than the surface area of the upper region 20*b*. Furthermore, the left and right end parts of the upper region 20*b* protrude upward so as to cover a part of a A-pillar 19 (see FIG. 1). Note that the proportion of the surface area of the front region 20*a* to the surface area of the upper region 20*b* can be appropriately changed depending on the type of vehicle in which the airbag device is mounted. For example, in the case of a truck, SUV, or the like in which the windshield 14 is disposed at an angle close to vertical, the surface area of the upper region 20*b* can be made larger than that of the front region 20*a*.

The lower surface of the main chamber 20 is formed with a plurality of vent holes 26 for fluid communication with the sub-chamber 22. An inner vent 26 is formed through combination with a vent hole 26*b* formed in the upper surface of the sub-chamber 22. Furthermore, the periphery of the vent hole 26*b* of the main chamber 20 and the periphery of the vent hole 26*b* of the sub-chamber 22 are connected by sewing.

As depicted in FIG. 3, in the main chamber 20 laid flat, the row of vent holes 26*a* is arranged backward (upward in the figure) with respect to the center L1 in the front-to-back direction. Similarly, with the sub-chamber 22 laid flat, the row of vent holes 26*b* is located backward (upward in the figure) with respect to a center L2 in the front-to-back direction.

The sub-chamber 22 is formed to have a smaller volume than the main chamber 20. By keeping the volume of the sub-chamber 22 to the minimum necessary, the sub-chamber 22 can be expanded quickly.

As depicted in FIG. 2 and FIG. 3, the sub-chamber 22 is provided with diffusers 30L and 30R for efficiently guiding the gases discharged from the inflators 29L and 29R into the sub-chamber 22.

As depicted in FIG. 3, the flap 24 is formed in a trapezoid shape with a wider width at the back, and has a slit 32 formed in the center thereof extending in the left-right direction. With the present invention, the slits 32 may be replaced by breakable stitching lines. What is important is that the slits 32 (weakened parts) break or open as the airbag 18 deploys.

In the state depicted in FIG. 2, the wider edge of the flap 24 is connected to the back edge of the sub-chamber 22 at a connection point 33*a* by sewing. When the airbag 18 is folded, the narrow end part of the flap 24 is sewn to the front edge of the sub-chamber 22 at a connection point 33*b*.

The flap 24 is a cloth-like member made of a flexible material, and can be made of, for example, the same or similar fabric as the airbag 18. Additionally, the shape of the flap 24 may be other than trapezoidal depending on the location of the airbag to which the flap is connected and the shape of the airbag itself.

The slits 32 of the flap 24 are configured to maintain the compressed state of the main chamber 20 without breaking or opening until the main chamber 20 reaches above the hood 12 as the airbag 18 deploys. It is important here that the flap 24 does not interfere as the main chamber 20 unfolds forward over the hood 12.

Airbag Folding Process

Next, the process of folding the airbag 18 according to the present Embodiment will be described. FIG. 4(A), 4(B), FIG. 5, and FIGS. 6(A) and 6(B) are plan views and cross-sectional views depicting a method for manufacturing a pedestrian protection airbag device (a method for compressing the airbag) according to the present invention.

Figure 4A:
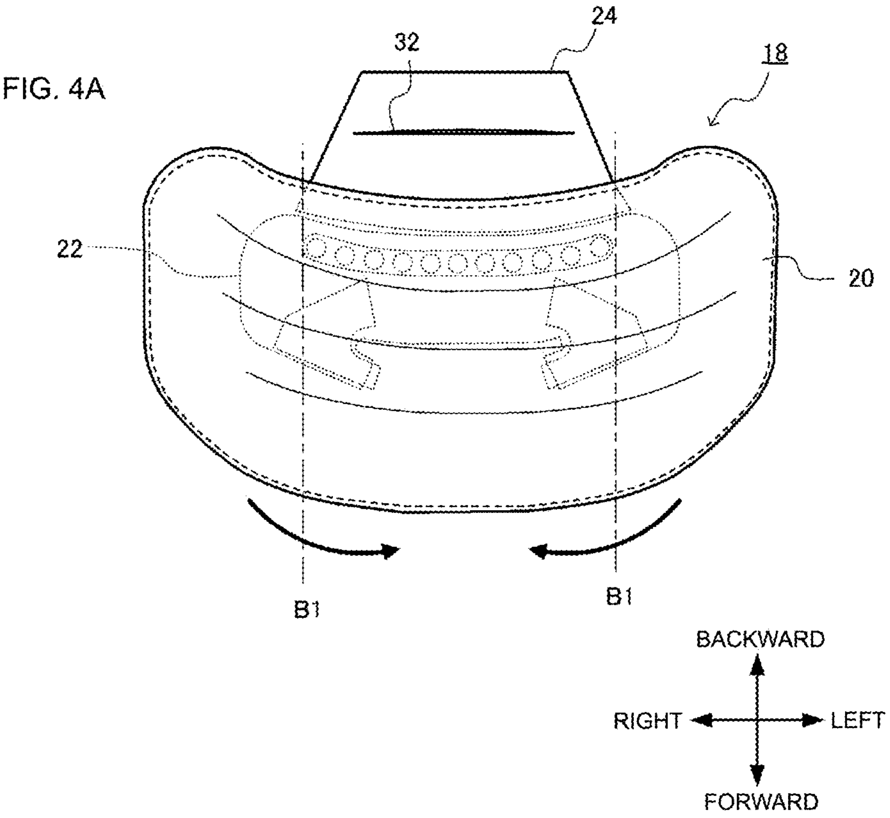
FIGS. 4(A) and 4(B) are plan views depicting a method of manufacturing the pedestrian protection airbag device (method of compressing the airbag) according to the present invention.

As depicted in FIG. 4(A), the outer periphery of the sub-chamber 22 is sewn to the main chamber 20, and the periphery of the vent holes 26 (26*a*, 26*b*) of the sub-chamber 22 and the main chamber 20 are sewn together, thereby connecting the sub-chamber 22 and the main chamber 20. In addition, one edge part of the flap 24 is sewn to the back edge of the sub-chamber 22.

Figure 4B:
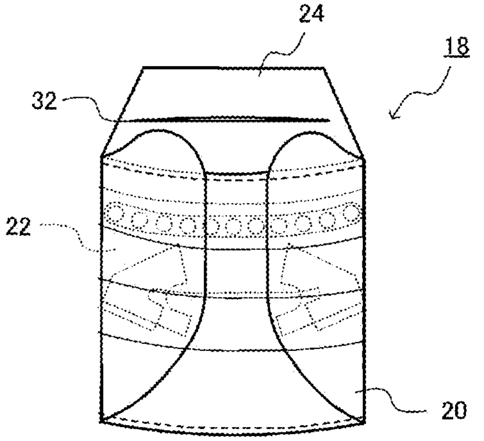

Next, as depicted in FIG. 4(B), the left and right sides of the airbag 18 (mainly the main chamber 20) are folded inward along the folding lines B1. Here, the folding line B1 is positioned outside the vent hole 26.

Figure 5:
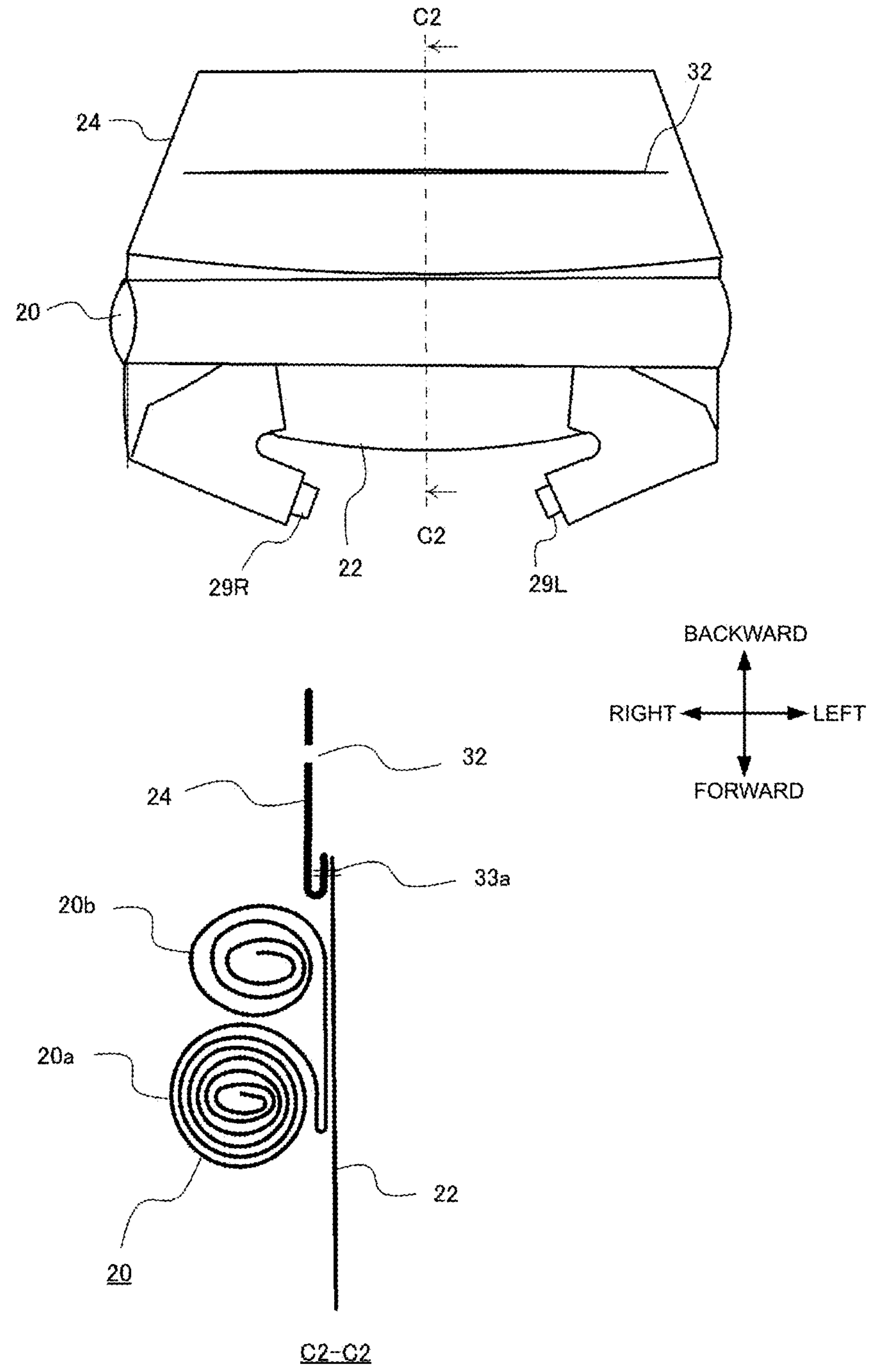
FIG. 5 is a plan view and a cross-sectional view depicting a method for manufacturing the pedestrian protection airbag device according to the present invention (a method for compressing an airbag, continued from FIG. 4)

Next, as depicted in FIG. 5, the main chamber 20 is compressed by rolling from the front and back. Here, since the main chamber 20 is wider at the front than the sub-chamber 22, the diameter of the roll on the front side is larger than the diameter of the roll on the back side.

Figure 6A:
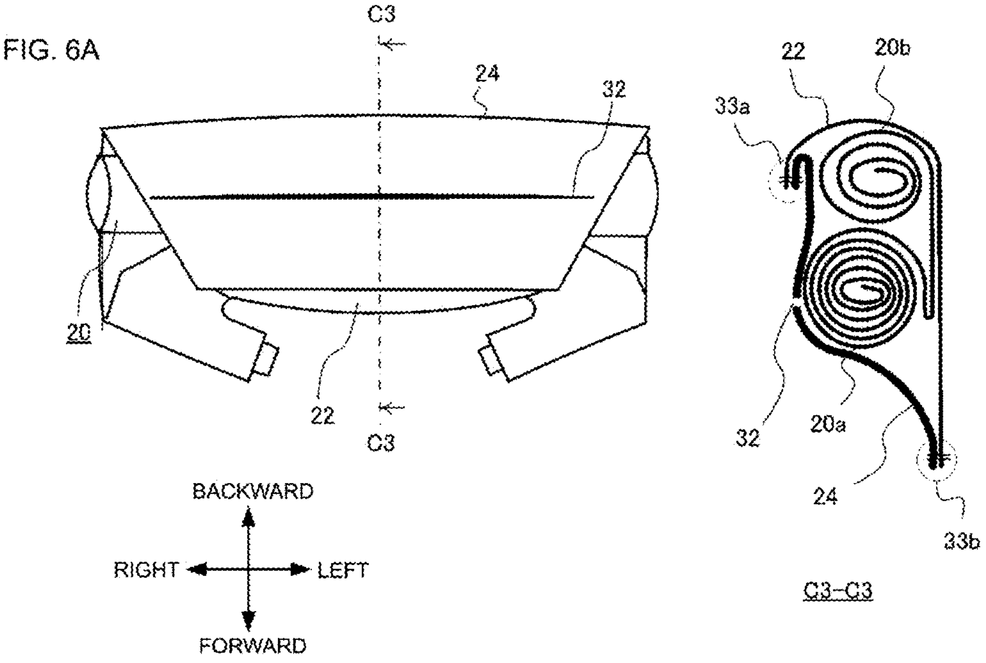
FIGS. 6A and 6B are a plan view and a cross-sectional view depicting a method for manufacturing the pedestrian protection airbag device according to the present invention (a method for compressing an airbag, continued from FIG. 5)

Next, as depicted in FIG. 6(A), the flap 24 is placed over the rolled main chamber 20 and sewn to the front end of the sub-chamber 22. As a result, the roll-shaped main chamber 20 is enveloped from the front-to-back direction by the flap 24 and the sub-chamber 22.

Figure 6B:
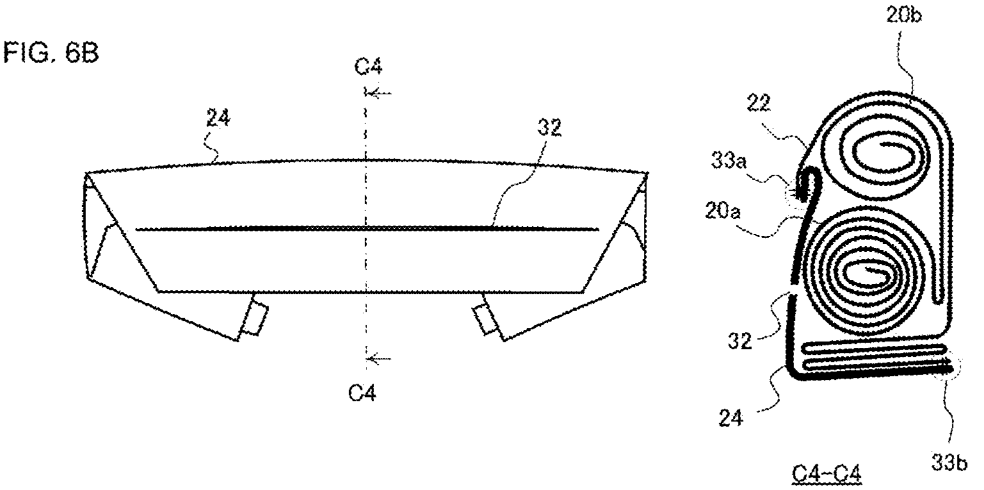

Next, as depicted in FIG. 6B, the front portion of the sub-chamber 22 is folded in an accordion-like manner.

Airbag Deployment Behavior

FIG. 7(A), 7(B), and FIG. 8(A), 8(B) are cross-sectional views depicting the deployment behavior of the pedestrian protection airbag 18 according to the present invention. FIGS. 9(A) and 9(B) are perspective views depicting the deployed state of the pedestrian protection airbag according to the present invention.

Figure 7A:
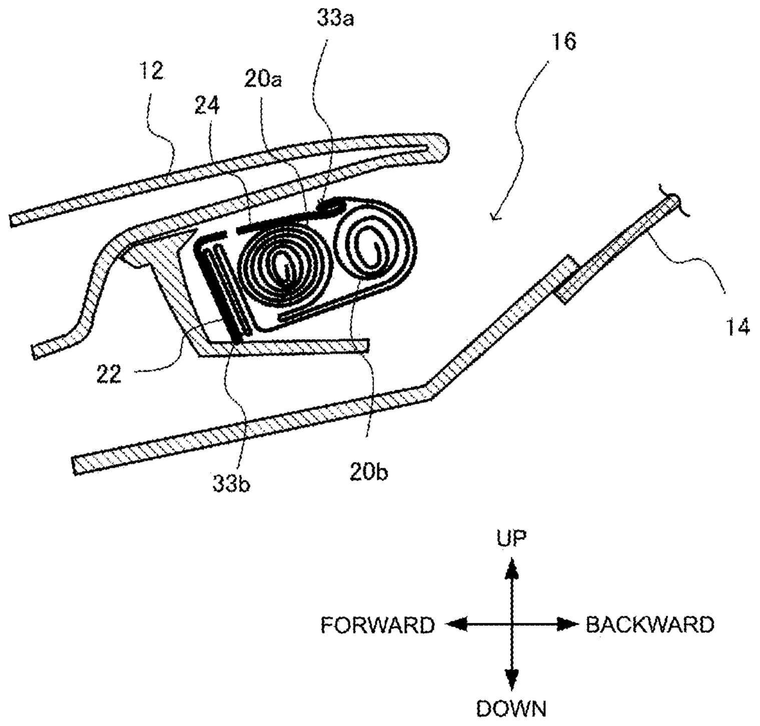
FIGS. 7(A) and (B) are cross-sectional views depicting the deployment behavior of the pedestrian protection airbag according to the present invention.
Figure 7B:
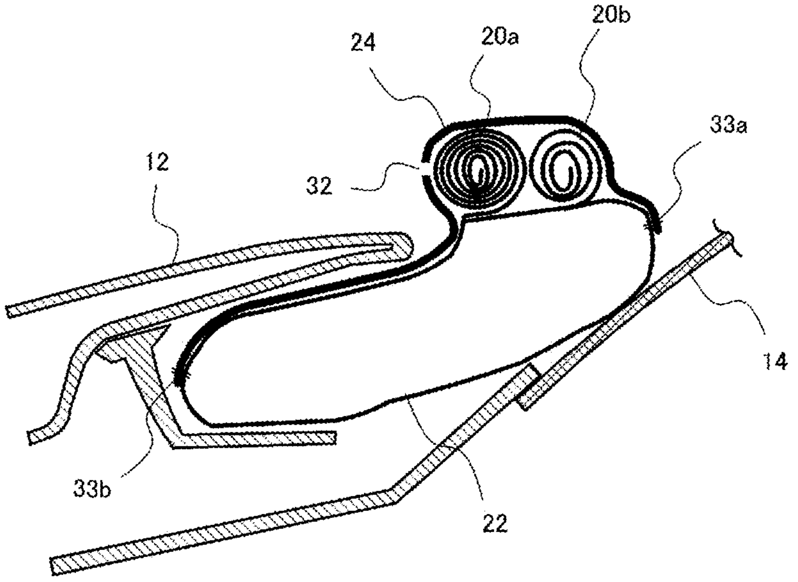

FIG. 7(A) depicts the state before the airbag device is deployed. When the vehicle 10 is in a collision, expansion gas is supplied from the inflators 29L, 29R (see FIG. 2 and FIG. 5) to the sub-chamber 22 via the diffusers 30L, 30R. Then, as depicted in FIG. 7(B), the sub-chamber 22 expands and develops so as to push the main chamber 20 upward. At this time, the front portion of the sub-chamber 22 receives a reaction force from a member such as the housing and deploys backward.

As the sub-chamber 22 expands, the portion corresponding to the main chamber 20 reaches above the hood 12, but the slit 32 in the flap 24 is not broken or opened. In this state, the slit 32 is located approximately at the front end of the main chamber 20.

Figure 8A:
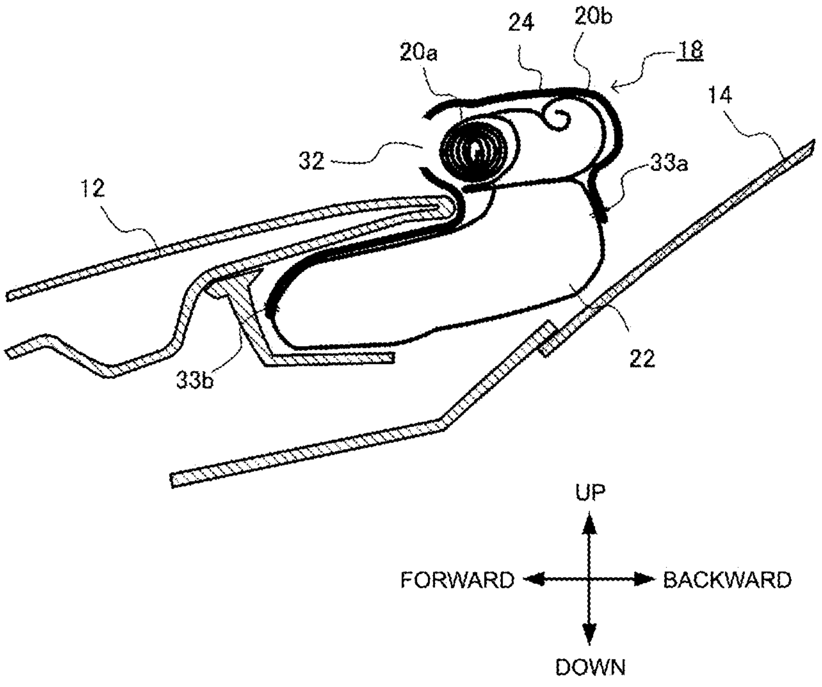
FIGS. 8(A) and 8(B) are cross-sectional views depicting the deployment behavior of the pedestrian protection airbag according to the present invention.
Figure 9A:
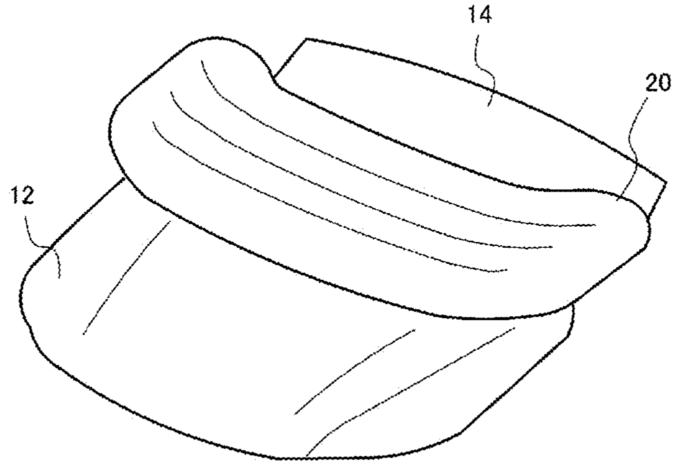
FIGS. 9(A) and 9(B) are perspective views depicting the deployed state of the pedestrian protection airbag according to the present invention.
Figure 9B:
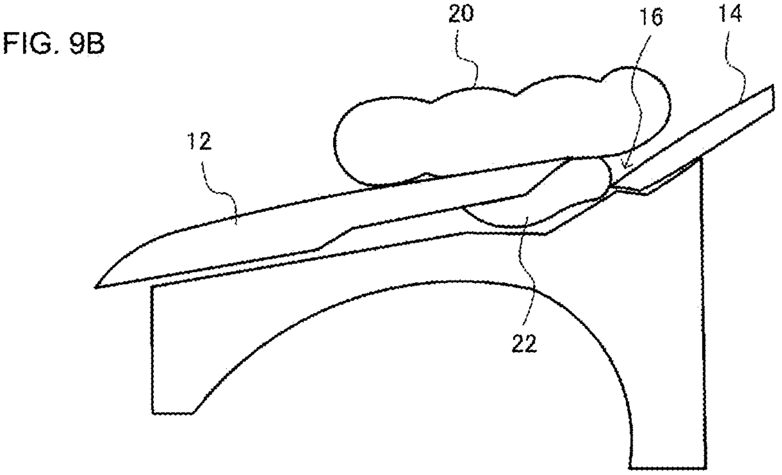

When the expansion gas flows from the sub-chamber 22 into the main chamber 20, the slit 32 in the flap 24 begins to open as depicted in FIG. 8(A), but the flap 24 still restricts the main chamber 20 from expanding upward.

Figure 8B:
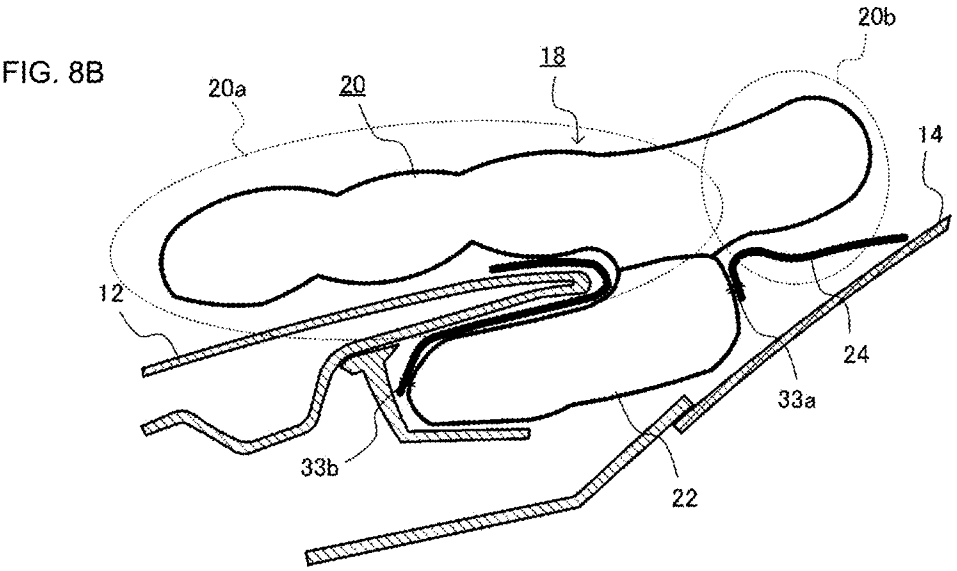

When the expansion gas further flows into the main chamber 20, the flap 24 breaks at the slit 32, as depicted in FIG. 8(B), and the main chamber 20 deploys widely forward. The state in which the airbag 18 (20, 22) is fully deployed is depicted in FIG. 9(A), (B).

In the present Embodiment, the flap 24 restricts the upward deployment of the main chamber 20, and the main chamber 20 tends to deploy forward rather than upward, so that the main chamber 20 can be deployed quickly onto the hood 12.

Note that in the present Embodiment, when the airbag 18 deploys from the boundary between the hood 12 and the windshield 14 of the vehicle, the deployment of the airbag 18 itself expands the gap at the boundary part. However, the present invention is not limited to this configuration, and a lifter that pushes up the back portion of the hood 12 may be provided to enlarge the gap at the boundary between the hood 12 and the windshield 14.

Although the present invention has been described with reference to embodiments, the present invention is not limited in any way to these embodiments, and can be changed as appropriate within the scope of the technical concept of the present invention.

The invention claimed is:

1. A pedestrian protection airbag device, comprising:

a gas generator that generates expansion gas; and an airbag that is expanded by the expansion gas that protects a pedestrian and the like that collides with a vehicle by deploying from a boundary part of a hood and a windshield of the vehicle, wherein the airbag includes:

a main chamber enabled to deploy from the boundary part on an upper part of the hood; and a sub-chamber connected to a lower part of the main chamber and the sub-chamber is in fluid communication with the main chamber by a plurality of vent holes, wherein the sub-chamber deploys under the hood prior to deployment of the main chamber.

2. The pedestrian protection airbag device according to claim 1, wherein the sub-chamber deploys in a manner so as to push the main chamber upwardly over an upper part of the hood.

3. The pedestrian protection airbag device according to claim 2, wherein in a fully deployed state of the airbag, a center of the sub-chamber in a front-to-back direction of the vehicle is located backward of a center of the main chamber in the front-to-back direction of the vehicle.

4. The pedestrian protection airbag device according to claim 1, wherein the plurality of vent holes are formed backward of a center of the sub-chamber in a front-to-back direction of the vehicle.

5. The pedestrian protection airbag device according to claim 1, wherein the gas generator is stowed in the sub-chamber.

6. The pedestrian protection airbag device according to claim 5, wherein the sub-chamber has a smaller volume than the main chamber.

7. The pedestrian protection airbag device according to claim 1, wherein the main chamber is configured such that a surface area of a front region that deploys onto the hood is larger than a surface area of an upper region that extends onto the windshield.

8. The pedestrian protection airbag device according to claim 7, wherein the front region and the upper region of the main chamber are folded or rolled separately.

9. The pedestrian protection airbag device according to claim 8, wherein the main chamber and the sub-chamber are folded or rolled separately.

10. The pedestrian protection airbag device according to claim 1, wherein:

a flap is provided on an outer periphery of the airbag in a compressed state and is capable of controlling a deployment direction of the airbag; and the flap has a weakened part that breaks or opens in a desired direction of deployment of the airbag as the airbag expands and deploys.

11. The pedestrian protection airbag device according to claim 10, wherein the weakened part is formed in a vicinity of a front end of the airbag.

12. The pedestrian protection airbag device according to claim 10, wherein the weakened part is a slit or a breakable sewing line.

13. A pedestrian protection airbag device, comprising:

a gas generator that generates expansion gas; and an airbag that is expanded by the expansion gas that protects a pedestrian and the like that collides with a vehicle by deploying from a boundary part of a hood and a windshield of the vehicle, wherein the airbag includes:

a main chamber enabled to deploy from the boundary part on an upper part of the hood; and a sub-chamber connected to a lower part of the main chamber that deploys prior to the main chamber under the hood, wherein:

a flap is provided on an outer periphery of the airbag in a compressed state and is capable of controlling a deployment direction of the airbag; and the flap has a weakened part that breaks or opens in a desired direction of deployment of the airbag as the airbag expands and deploys, wherein the weakened part is formed in a vicinity of a front end of the airbag, wherein the flap retains the main chamber without breaking or opening the weakened part until the main chamber reaches to the upper part of the hood as the airbag deploys.

14. The pedestrian protection airbag device according to claim 13, wherein the sub-chamber and the main chamber are in fluid communication with each other through an inner vent.

15. A pedestrian protection airbag device, comprising:

a gas generator that generates expansion gas; and an airbag that is expanded by the expansion gas that protects a pedestrian and the like that collides with a vehicle by deploying from a boundary part of a hood and a windshield of the vehicle, wherein the airbag includes:

a main chamber enabled to deploy from the boundary part on an upper part of the hood; and a sub-chamber connected to a lower part of the main chamber that deploys prior to the main chamber under the hood, wherein:

a flap is provided on an outer periphery of the airbag in a compressed state and is capable of controlling a deployment direction of the airbag; and the flap has a weakened part that breaks or opens in a desired direction of deployment of the airbag as the airbag expands and deploys, wherein the weakened part is formed in a vicinity of a front end of an undeployed main chamber when the sub-chamber is expanded and deployed so as to push the main chamber upward.

* * * * *